United States Patent Office 3,076,840
Patented Feb. 5, 1963

3,076,840
PROCESS OF PREPARING ESTERS FROM OLEFINS
John T. Brandenburg, Wappingers Falls, N.Y., and Morford C. Throckmorton, Akron, Ohio, assignors to Texaco Inc., New York, N.Y., a corporation of Delaware
No Drawing. Filed Dec. 16, 1960, Ser. No. 76,109
8 Claims. (Cl. 260—497)

The subject invention relates to a process for preparing tertiary alkyl esters of carboxylic acids. More particularly, it relates to a process for reacting a tertiary base olefin, also called a tertiary olefin, with a carboxylic acid in a liquid phase reaction employing a solid catalyst.

In the commonly assigned, copending application Serial No. 801,434, filed March 24, 1959, in the names of R. Y. Heisler, H. V. Hess, G. W. Eckert, and M. C. Throckmorton, there is disclosed a process for preparing tertiary alkyl esters of carboxylic acids in a liquid phase reaction employing a solid catalyst broadly described as a period III polyvalent metal silicate. Both synthetic and naturally occurring period III polyvalent metal silicates, which are exemplified by silica-alumina and silica-magnesia cracking catalysts, are effective in directing the reaction between carboxylic acids and tertiary olefins to form t-alkyl esters. This invention involves the discovery that period III polyvalent metal silicate catalysts having a fluorine content within a prescribed range have enhanced activity in the esterification reaction.

The process of this invention for preparing tertiary esters of carboxylic acids comprises reacting a tertiary olefin with a carboxylic acid in the presence of a period III polyvalent metal silicate catalyst containing 0.25 to 4.0 weight percent fluorine at a temperature between 100 and 300° F. and at a pressure sufficient to maintain liquid phase operation which usually falls between 25 and 500 p.s.i.g.

The term "tertiary olefin" denotes a material in which at least one of the carbon atoms forming the olefinic bond is completely substituted with carbon atoms or, stated another way, at least one of the double-bonded carbon atoms is devoid of a hydrogen substituent. The most common tertiary olefins are those in the aliphatic series containing 4–18 carbon atoms. Examples of these tertiary olefins are isobutylene, 2 - methyl-2-butene, 2-methyl-2-pentene, 2 - methyl-1-butylene and 3-methyl-3-octene. Cycloaliphatic olefinic compounds such as 1-methyl-1-cyclohexene are also tertiary olefins and usable in the process of the invention for preparing tertiary alkyl esters. The olefins most commonly employed in the process of the invention because of cost and availability are isobutylene, 2-methyl-1-butene and 2-methyl-2-butene.

Tertiary olefins can be employed in a relatively pure condition or in admixture with one another, with other olefins or with paraffinic hydrocarbons. In the production of tertiary butyl esters of monocarboxylic acids which are useful as octane appreciators for leaded gasolines, there may be used pure isobutylene formed by cracking isobutylene dimer or so-called "B—B" stream from catalytic cracking which comprises approximately 10–25 mol percent isobutylene, 50 mol percent paraffins with the balance comprising butene-1 and cis- and transbutene-2. When a "B—B" stream is employed, isobutylene selectively reacts with the monocarboxylic acid with the result that t-butyl esters are produced to the substantial exclusion of secondary esters.

The carboxylic acid reactant employed in the process of this invention is normally a hydrocarbyl monocarboxylic acid containing 1–20 carbon atoms and usually containing 1–12 carbon atoms. The process of the invention is also effective, however, with polybasic acids containing two or more carboxylic acid radicals and 2 to 12 or more carbon atoms. The carboxylic acid reactant can also contain substituents in place of the hydrogen atoms on the hydrocarbon skeleton, for example, keto radicals, nitro radicals, halogen atoms, alkoxy radicals and sulfhydryl radicals can be present on the carbon skeleton of the monocarboxylic acid.

Effective carboxylic acids in the process of the invention for producing tertiary esters are exemplified by acetic acid, malonic acid, propionic acid, butyric acid, isobutyric acid, valeric acid, isovaleric acid, 2-ethylhexanoic acid, benzoic acid, caproic acid, formic acid, cyclohexanecarboxylic acid, sebacic acid, adipic acid and azelaic acid. The acids can be dissolved in inert vehicles such as selected hydrocarbon fractions, dialkyl ethers, aromatic solvents such as benzene and toluene. The use of solvents for dissolving the reactants is particularly useful in situations where the acid reactant is a solid.

The esterification process of the invention is normally effected with one of the reactants, usually the tertiary olefin, in excess. When forming t-alkyl esters of monocarboxylic acid it is advantageous to use mol ratios of olefin to acid between 1.2–5:1 and preferably between 2–4:1. Although an excess of olefin over acid is normally employed, the process of the invention also proceeds smoothly employing an excess of carboxylic acid reactant.

The esterification reaction of this invention is effected at a temperature between 100–300° F. and preferably at a temperature between about 125–200° F.

The esterification reaction is effected at a pressure sufficient to maintain liquid phase reaction conditions. Pressures between about 25 and 500 p.s.i.g. can be employed but the reaction is normally effected at pressures between 75 and 300 p.s.i.g.

Since the catalyst is solid, the reactants are advantageously pumped through a fixed bed of the catalyst in a continuous manner. Space velocities for the operation between 0.1 and 5 liquid volumes of feed per bulk volume of catalyst per hour are recommended with the preferred space velocity falling between 0.25 and 2 v./v./hr.

The period III polyvalent metal silicate catalysts whose activity in the t-alkyl ester forming reaction is increased by treatment with hydrogen fluoride comprise 5–50 weight percent of a period III metal oxide with the remainder comprising silica. Magnesium silicate, aluminum silicate and mixtures of these materials are commonly used in the t-alkyl ester forming reaction. In silica-alumina catalysts the alumina content ordinarily falls between 9 and about 25% and in silica-magnesia catalysts the magnesia content normally falls between 20 and 30 weight percent.

Period III polyvalent metal silicate catalysts whose effectiveness is enhanced by the presence of the prescribed fluorine content are either of the synthetic variety or are naturally occurring class of zeolites comprising mainly a period III polyvalent metal oxide and silica.

Period III polyvalent metal silicates can also contain 1–20 weight percent of the following metal oxides as promoters: iron oxide, titanium oxide, thorium oxide, boron oxide, zirconium oxide and mixtures thereof. The usual concentration of these promoters falls in the range of 0.5 to 5.0 weight percent of period III polyvalent metal silicate catalysts.

The fluorine content of the period III polyvalent metal silicate catalyst is critical for obtaining the desired increase in catalyst activity and higher yields of t-alkyl ester without causing excessive polymerization of the tertiary olefin. A fluorine content of at least 0.5 weight percent is necessary in order to maintain an improvement in tertiary alkyl ester yield while concentrations above the prescribed maximum of 4.0 weight percent cause excessive tertiary olefin polymerization. The preferred fluorine content in the period III polyvalent metal silicate catalyst falls between 1.0 and 3.5 weight percent. Within this range maximum yield improvement is obtained while avoiding excessive olefin polymerization.

The prescribed fluorine content is usually obtained by soaking the period III polyvalent metal silicate catalyst with an aqueous solution of hydrogen fluoride. The hydrogen fluoride is present in the aqueous solution in an amount equal to or slightly in excess of the stoichiometric required for the desired fluorine level within the prescribed 0.5–4.0 weight percent range. After soaking the period III polyvalent metal silicate catalyst for a period of 5 minutes to 60 minutes, the catalyst is drained and calcined at an elevated temperature between about 500 and 1000° F. This method of treating the catalyst with hydrogen fluoride ensures its uniform distribution throughout the catalyst.

Another procedure for treating the catalyst to obtain the desired fluorine content involves adding the calculated amount of hydrogen fluoride to an inert gas and passing the hydrogen fluoride containing gas through the period III polyvalent metal silicate catalyst. In this method of incorporating the hydrogen fluoride it is desirable to keep the hydrogen fluoride content of the gas stream below about 10% in order to ensure uniform distribution of the hydrogen fluoride throughout the catalyst.

The superiority of period III polyvalent metal silicate catalysts containing the prescribed 0.5–4.0 weight percent fluorine over fluorine-free period III polyvalent metal silicate catalysts in the liquid phase reaction of a tertiary olefin with a monocarboxylic acid to form a tertiary ester is illustrated in the data shown in Table I wherein a fluorine-free silica-magnesia catalyst comprising approximately 72 weight percent magnesia and 28 weight percent silica was compared with silica-magnesia catalysts of similar composition containing fluorine contents within the prescribed 0.5–4.0 weight percent range. In the runs shown in Table I, isobutylene and acetic acid were charged to a reaction vessel containing the various catalysts being compared in a mol ratio of isobutylene to acid of 0.5, at a space velocity of 0.5 volume of reactant feed per volume of catalyst per hour, at a temperature of 150° F. and a pressure of 200 p.s.i.g.

TABLE I

*Comparison of Fluorine Containing Silica-Magnesia Catalyst With Untreated Silica-Magnesia Catalyst in t-Butyl Acetate Formation*

| Catalyst | Run Duration, hrs. | Ester Yield, Mol percent Basis Acid |
|---|---|---|
| Silica-magnesia | 200 | 29.9 |
| Silica-magnesia containing 1.82% fluorine | 200 | 38.0 |
| Silica-magnesia containing 2.37% fluorine | 200 | 38.3 |
| Silica-magnesia containing 3.69% fluorine | 100 | 38.4 |

The data in the above table demonstrate the superior yields of t-butyl acetate obtained when employing period III polyvalent metal silicate catalysts containing the prescribed fluorine content in the production of t-alkyl esters from tertiary olefins and a carboxylic acid.

In Table II there is shown the improvement in catalyst activity in the t-alkyl ester forming reaction of a silica-alumina cracking catalyst comprising 25% alumina and 75% silica sold as Aerocat AAA. In the data presented in Table II Aerocat AAA catalyst and hydrogen fluoride treated-Aerocat AAA catalyst containing 1% fluorine were compared at two temperature levels in the formation of tertiary butyl acetate from isobutylene and acetic acid. The desired fluorine content was obtained by soaking Aerocat AAA catalyst with a water solution of hydrogen fluoride containing calculated amount of HF to give the resulting catalyst a 1% fluorine content.

In the runs shown in Table II, isobutylene and acetic acid were charged to the reactor in an olefin to acid mol ratio of 2 and at a liquid space velocity of 0.5 v./v./hr. and at essentially equivalent pressures.

TABLE II

COMPARISON AT 125° F.

| Catalyst | Isobutylene Conversion, percent | Catalyst Selectivity, percent | Ester Yield, percent |
|---|---|---|---|
| Silica-alumina: | | | |
| 10 hours | 30 | 90 | 51 |
| 25 hours | 23 | 94 | 38 |
| Silica-alumina containing 1 percent fluorine: | | | |
| 12 hours | 52 | 75 | 73 |
| 36 hours | 36 | 88 | 63 |
| 60 hours | 28 | 92 | 53 |

COMPARISON AT 150° F.

| Silica-alumina: | | | |
|---|---|---|---|
| 10 hours | 39 | 83 | 59 |
| 25 hours | 32 | 87 | 52 |
| Silica-alumina containing 1 percent fluorine: | | | |
| 12 hours | 52 | 59 | 63 |
| 36 hours | 35 | 84 | 62 |
| 48 hours | 35 | 87 | 59 |

The data in the foregoing table demonstrate that higher conversions and higher ester yields are obtained with the use of hydrogen fluoride treated silica-alumina containing the prescribed content of fluorine. Particularly significant are the higher ester yields resulting from the use of the fluorine containing catalyst. The catalyst selectivity of the fluorine containing catalyst is lower initially than that of the base catalyst but the selectivity increases with time as is clearly shown by the above data.

In the data presented in Table II the percent isobutylene conversion was determined by dividing the mols of isobutylene converted by the mols of isobutylene charged and multiplying by 100. The percent catalyst selectivity was determined by dividing the amount of isobutylene converted to tertiary butyl acetate by the total amount of isobutylene converted and multiplying by 100. The percent tertiary butyl acetate yield was determined by dividing the mols of tertiary butyl acetate produced by the mols of acetic acid charged (the minor reactant) to the reactor and multiplying by 100.

In Table III data are presented to illustrate that excessive polymerization is obtained employing a silica-alumina catalyst containing more than the prescribed 4.0 maximum percent fluorine for the preparation of t-butyl acetate by reaction of isobutylene and acetic acid. The silica-alumina catalyst employed in the data presented in Table III was obtained by treating a silica-alumina cracking catalyst comprising 25% alumina and 75% silica with an aqueous hydrogen fluoride solution, subsequently drying and calcining at 1000° F. for six hours to give a catalyst having a fluorine content of about 4.96%. The isobutylene and acetic acid were charged to the reactor containing the silica-alumina catalyst containing 4.96% fluorine in an olefin to acid mol ratio of 2, at a liquid space velocity of 0.5 v./v./hr. and at a pressure of 250 p.s.i.g. The results obtained in two 12-hour periods at temperature levels of 126° F. and 152° F. are shown in Table III.

TABLE III

| Temperature | Ester Yield, Percent | Percent Polymer, Basis Olefin Charge |
|---|---|---|
| 126° F | 28.2 | 60.8 |
| 152° F | 32.4 | 49.8 |

The data in the above table demonstrate clearly the excessive polymerization resulting from the use of a period III polyvalent metal silicate catalyst containing more than the prescribed maximum 4.0% fluorine for the preparation of esters by reaction of tertiary olefins and carboxylic acids. The polymer yields of 60.8% and 49.8% basis the olefin charge are excessive and indicate poor catalyst selectivity. This contrasts sharply with the good catalyst selectivity obtained with a period III polyvalent metal silicate catalyst having a fluorine content within the prescribed range of 0.5–4.0 weight percent.

We claim:

1. In a process for reacting a tertiary olefin with a carboxylic acid to form the corresponding ester, the improvement which comprises contacting said reactants in the liquid phase at a temperature between 100 and 300° F. in the presence of a period III polyvalent metal silicate catalyst containing 0.5 to 4.0 weight percent fluorine, said polyvalent metal silicate catalyst consisting mainly of 5–50 weight percent period III polyvalent metal oxide and 50–95 weight percent silica.

2. The improvement according to claim 1 in which a temperature between 125 and 250° F. is employed.

3. The improvement according to claim 1 in which a pressure between 25 and 500 p.s.i.g. is employed.

4. The improvement according to claim 1 in which period III polyvalent metal silicate catalyst contains 1.0 to 3.5 weight percent fluorine.

5. The improvement according to claim 1 in which a silica-alumina catalyst containing 1.0–3.5 weight percent fluorine is employed.

6. The improvement according to claim 1 in which a silica-magnesia catalyst containing 1.0 to 3.5 weight percent fluorine is employed.

7. The improvement according to claim 1 in which said catalyst is prepared by soaking a period III polyvalent metal silicate catalyst in an aqueous solution containing the stoichiometric amount of hydrogen fluoride required to give the prescribed fluorine content and subsequently calcining said catalyst.

8. The improvement according to claim 1 in which said catalyst is prepared by contacting a period III polyvalent metal silicate catalyst with a gaseous mixture of an inert gas and hydrogen fluoride in the stoichiometric amount required to give the prescribed fluorine content, said hydrogen fluoride content of said gaseous mixture being less than 10 volume percent.

References Cited in the file of this patent

UNITED STATES PATENTS

| | | |
|---|---|---|
| 2,415,000 | Bearse et al. | Jan. 28, 1947 |
| 2,525,145 | Mavity | Oct. 10, 1950 |